Aug. 4, 1970
L. M. WETZIG ET AL
3,523,266
COMPOSITE AIR AND ELECTRICAL COUPLING
Filed March 20, 1968
2 Sheets-Sheet 1
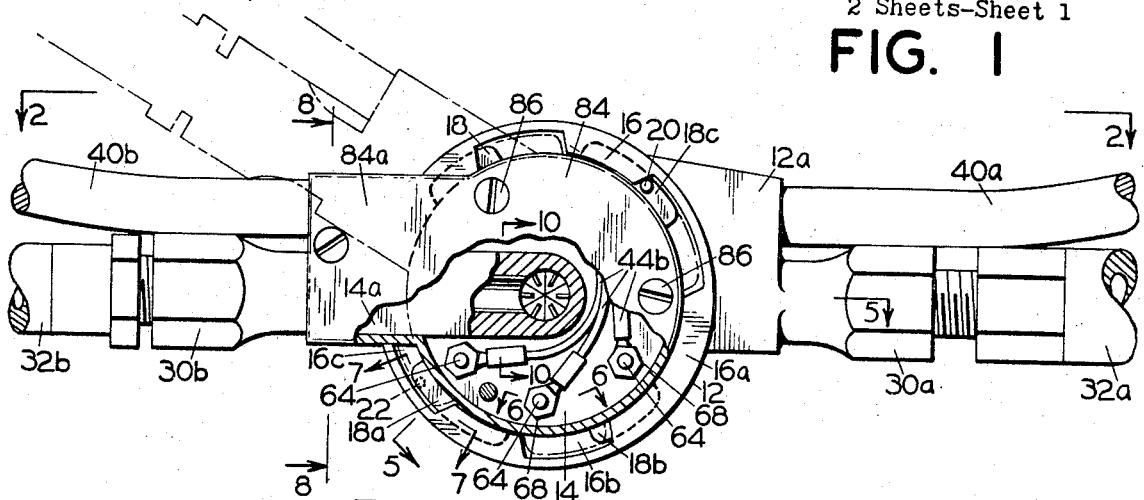
FIG. 1
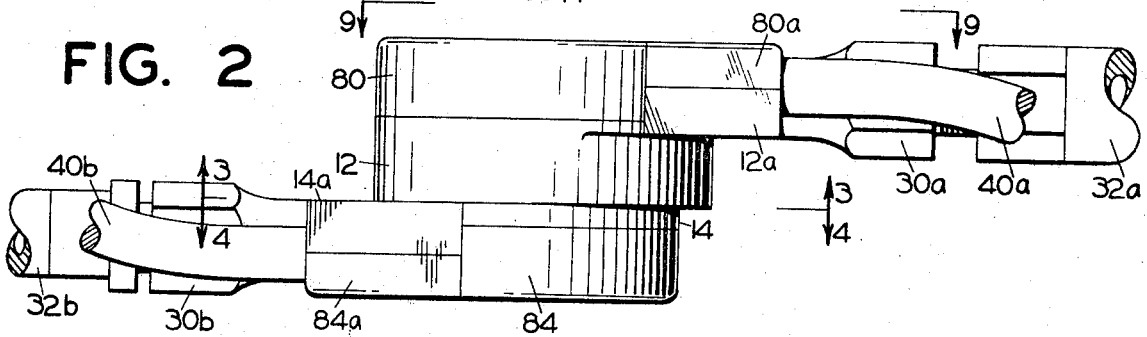
FIG. 2
FIG. 10
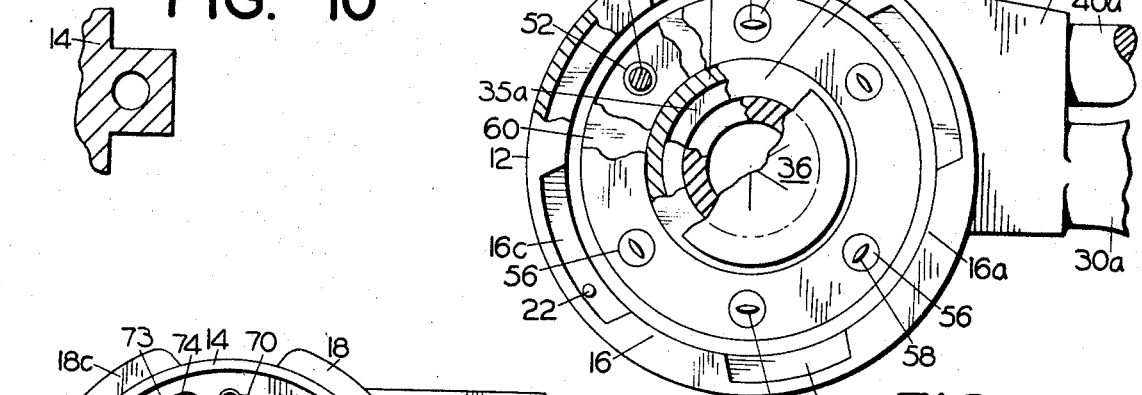
FIG. 3
FIG. 4
INVENTORS.
LLOYD M. WETZIG
LLOYD A. KING
BY Eugene P. Farley
ATTY.

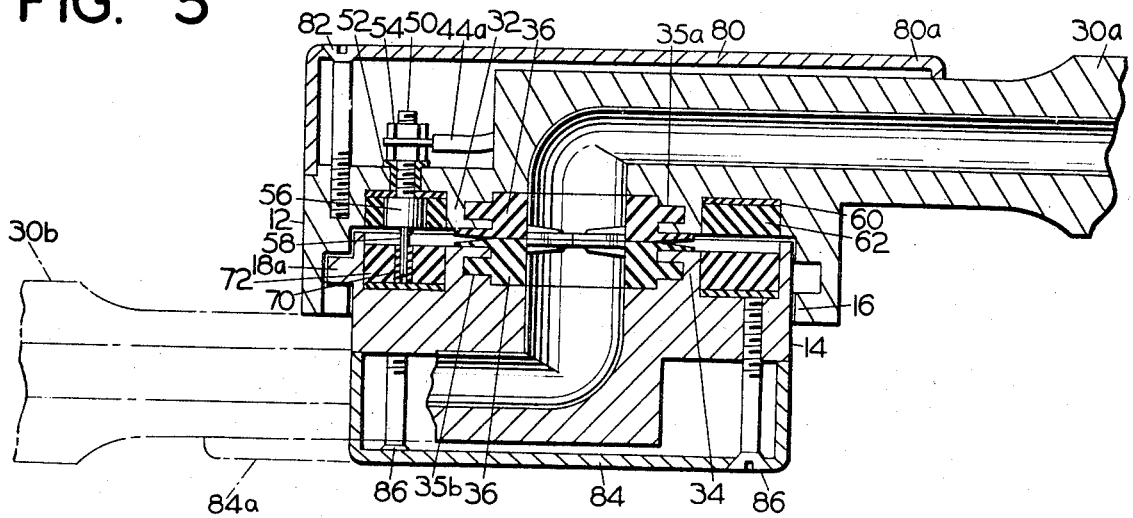
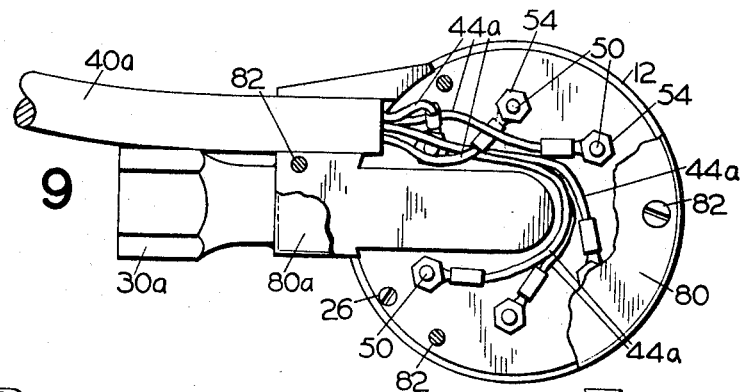
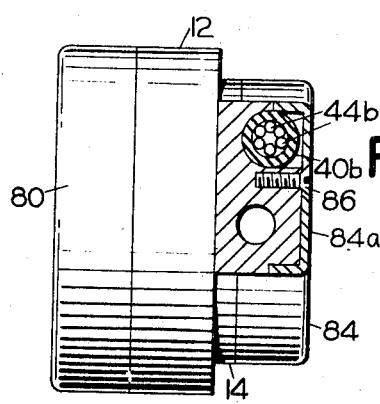
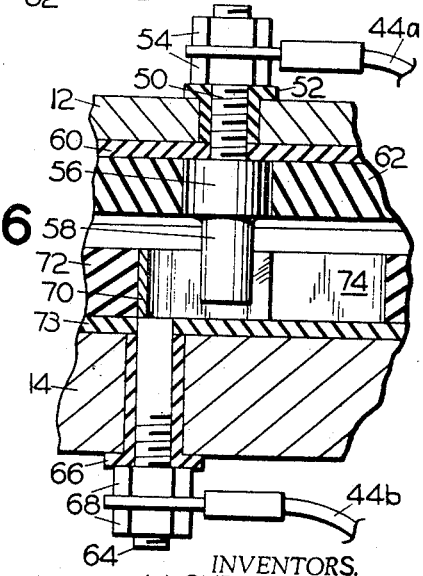
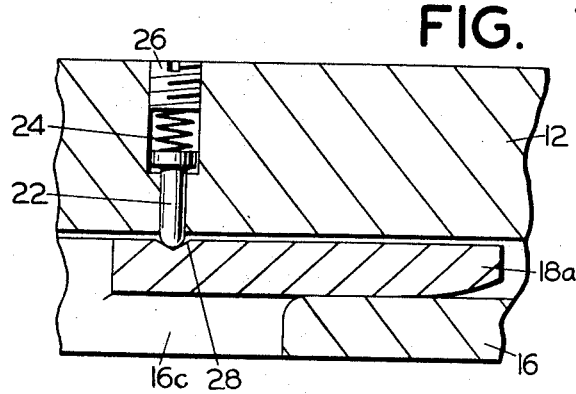

United States Patent Office

3,523,266
Patented Aug. 4, 1970

---

3,523,266
COMPOSITE AIR AND ELECTRICAL COUPLING
Lloyd M. Wetzig, 465 N. 22nd St., and Lloyd A. King, 2120 N. A St., both of Springfield, Oreg. 97477
Filed Mar. 20, 1968, Ser. No. 714,638
Int. Cl. H01r *13/54, 23/54*
U.S. Cl. 339—15                                5 Claims

ABSTRACT OF THE DISCLOSURE

A composite air and electrical coupling is designed for use particularly on truck-trailer units. It comprises a hollow case formed in two telescoping, cupped sections releasably interengageable with each other. Air conduit and electrical conductors, both formed in two sections, are mounted one section on each of the case sections. They are arranged so that when the case sections are interengaged, the conduit and electrical conductor sections are operatively coupled. Provision is made for shielding the coupling from dirt and for protecting its elements from damage by vibration.

---

This invention relates to a composite air and electrical coupling designed for use particularly in the operation of truck-trailer freight hauling units.

In the operation of conventional freight hauling units comprising a tractor and a trailer, it is necessary to connect the trailer to a source of air for operation of the trailer brakes and to a source of electricity for operation of the trailer lights. In view of the nature of the service, several problems are present.

First, since the trailer is connected and disconnected frequently to various tractor units, it is necessary to provide an air and electrical coupling which may be operated rapidly and easily.

Second, since a plurality of electrical circuits usually are involved for the operation of the trailer tail lights, clearance lights, auxiliary lights, etc., it is required that the coupling correctly align the various circuits with a minimum of effort on the part of the operator.

Third, since the truck-trailer outfit is traveling continuously over dusty roads, and in all sorts of atmospheric environments, it is necessary to provide an air-electrical coupling which protects the coupling elements from fouling by dirt and moisture.

Fourth, since the union between the tractor and the trailer is subjected continuously to vibration and displacement in all directions, it is necessary to provide an air and electrical connector which is proof against damage from vibration and displacement effects, with respect to inadvertent uncoupling and breakage.

It is the general purpose of the present invention to provide a composite air and electrical coupling for use primarily in truck-trailer combination units which offers a solution to the foregoing problems and which is installed easily and universally, which establishes and maintains proper alignment of the various circuits, which is proof against the corrosive action of dust and moisture, and which is not subject to uncoupling or damage from the vibration attending the operation of the truck-trailer unit.

The manner in which the foregoing and other objects of this invention are accomplished will be apparent from the accompanying specification and claims considered together with the drawing, wherein:

FIG. 1 is a side elevation of the presently described composite air and electrical coupling in its working position, partly broken away to show the interior construction;

FIG. 2 is a plan view of the coupling, viewed from the direction of the arrows of line 2—2 of FIG. 1;

FIG. 3 is an elevation of one of the units of the coupling (uncoupled), broken away and looking in the direction of the arrows of line 3—3 of FIG. 2;

FIG. 4 is an elevation of the other unit of the coupling (uncoupled), looking in the direction of the arrows of line 4—4 of FIG. 2;

FIG. 5 is a longitudinal sectional view taken along line 5—5 of FIG. 1;

FIG. 6 is a fragmentary, detail sectional view taken along line 6—6 of FIG. 1;

FIG. 7 is an enlarged detail sectional view taken along line 7—7 of FIG. 1;

FIG. 8 is a detail, transverse sectional view taken along line 8—8 of FIG. 1;

FIG. 9 is a side elevation of the connector looking in the direction of the arrows of line 9—9 of FIG. 2, with the exterior cap partly broken away to reveal interior construction; and FIG. 10 is a detail, fragmentary sectional view taken along line 10—10 of FIG. 1.

In its broad aspect, the composite air and electrical coupling of our invention comprises a hollow case formed in two telescoping, cupped sections. One of these is fastened to the truck and the other to the trailer. The two sections releasably may be interengaged. An air conduit and at least one electrical conductor are formed in two sections, one communicating with the truck and the other with the trailer, and mounted respectively on the two case sections.

The arrangement is such that when the case sections are engaged, the air conduit and electrical conductor sections contemporaneously are coupled and vice versa. In addition, means are provided for shielding the elements of the coupling from dirt and for protecting them from vibration.

Considering the foregoing in greater detail and with particular reference to the drawings:

The presently described air and electrical coupling includes a hollow case formed in two interengageable, telescoping, cupped sections, i.e. section 12 with extension 12a and section 14, with extension 14a. One of the sections is mounted rigidly on the truck and the other flexibly on the trailer or vice versa.

The two case sections may be formed of any suitable material, preferably from cast or turned aluminum or other metal. They are dimensioned so that when they are placed face to face, the one section will nest within the other to form a chamber in which the elements of the coupling are housed.

Suitable engaging means are provided for releasably interengaging the two case sections when it is desired to couple or uncouple the unit.

The preferred interengaging means for accomplishing this purpose comprises rotary interengaging means such as a plurality of spaced lugs 16, 16a, 16b and 16c on one of the case sections, for example on case section 12, and a plurality of spaced keys 18, 18a, 18b and 18c on the other, for example, on case section 14.

The dimensions of the keys and the spacing between the lugs is such that these elements may be engaged only in the proper operative position of the coupling elements housed in the case. They are arranged in such a manner that when one of the case sections is telescoped or nested within the other case section, a simple twist will move the case sections from a disengaged position in which the coupling elements are inoperative to an engaged position in which they are operative.

Stop means are provided for insuring that when the case sections are interengaged, they will be located precisely in the operative position of the coupling.

The stop means employed for this purpose comprises a pin 20, FIG. 1, mounted on key 18c and positioned to engage the leading edge of the adjacent lug 16 when the coupling is in its operative position.

Detent means are provided for insuring that the two case sections will remain releasably interlocked in their operative position in spite of the vibration of the truck-trailer unit on which the sections are mounted. The detent means employed for this purpose is illustrated in detail in FIG. 7.

Case section 12 is provided with a transverse bore which houses a reciprocatable pin 22 urged outwardly by a spring 24 and held in place by means of a screw plug 26. The outer end of pin 22 is rounded and dimensioned for reception in a detent 28 in the adjacent surface of key 18a when the coupling is in its operative position.

The force of spring 24 is sufficient to keep the case sections interlocked during travel of the truck-trailer unit. However, when it is desired to uncouple the unit, the air and electrical connections also may be uncoupled by a reverse twist of the case sections relative to each other.

The air conduit means associated with the hereindescribed coupling is formed in two sections 30a and 30b, one of which is connected to a source of air under pressure, for example, the air compressor on the truck, and the other to the device to be operated, for example, the air brakes on the trailer. To this end conduit sections 30a, 30b are secured by threaded connections to air hoses 32a, 32b at their outer ends.

To accommodate the inner ends of the air conduit sections, case sections 12, 14 are provided with central annular partitions 32, 34, FIGS. 3 and 4. These are coaxial with the respective case sections. On one end they register with each other and on the other they communicate with the respective conduit sections. Accordingly, when the case sections are telescoped one into the other, the inner ends of the air conduit sections exactly register with each other and retain their registration during angular manipulation of the case sections as they are interengaged.

Partitions 32, 34 are provided with interior annular recesses 35a, 35b in which are seated centrally slotted, conventional filter diaphragms 36. The diaphragms are fashioned from resilient rubber, plastic or other suitable material and serve the function of filtering out dust and dirt particles which may become introduced inadvertently into the air supply. They may be replaced from time to time as necessary.

At least one electrical conductor also is associated with the hereindescribed coupling. In the normal use of the coupling, there will be several such conductors to accommodate the various electrical circuits on the trailer which must be operated from the truck. In the embodiment described herein there are six such electrical conductors, although this number may vary with particular installations.

As shown in FIG. 1, there is associated with the coupling unit an electrical cable formed in two sections 40a and 40b, one leading to the truck and the other to the trailer. Each cable section houses six electrical conductors, 44a in the one and 44b in the other.

The inner ends of the electrical conductor sections terminate in electric switch elements which engage with interengagement with the case sections and disengage with disengagement of the case sections. The construction of a preferred form of these switch elements is illustrated in FIGS. 5 and 6.

Broadly considered, the switch elements comprise pin and socket elements of the class illustrated in the drawings. The pin or male element of the switch comprises an electrically conducting post 50 mounted in an insulated insert 52 which extends through the end wall of case section 12. In the illustrated form of the invention, there are six such posts spaced radially outwardly from the air chamber and spaced angularly from each other at regular intervals.

One of electrical conductor segments 44a is connected to each post 50 by means of lock nuts 54. Also, each post 50 has an enlarged central segment 56 which forms a base for an outwardly-extending, knife-shaped conductor element 58.

All of the posts are insulated electrically by means of an insulating ring 60 which seats in the well existing between the wall of the case segment and air conduit member 32. The balance of the well is filled with thermoplastic rubber 62 or other insulating material poured hot and allowed to cool and solidify.

Each companion electrical conductor segment 44b is attached to the outer threaded end of a post 64, received in an insulating bushing 66 which extends through the end wall of case section 14. It is secured to the post by means of lock nuts 68.

The inner end of the post is provided with a resilient clip 70 which provides the socket or female member of the electric switch assembly. The clip is dimensioned to receive knife element 58 in electrically conducting contact. By virtue of this construction the switch is rendered self-wiping so that positive electrical connection is made even if dust and dirt should form a deposit between the switch elements.

Clips 70 are maintained in operative position and electrically insulated by means of thermoplastic insulation material 72 and insulating ring 73. As is the case with insulation material 62, material 72 may comprise thermoplastic rubber or other electrical insulating material which is poured in a molten condition into the well existing between the outer side wall of the case and the air conduit member and allowed to solidify.

It is to be noted that during the application of insulation material 72, removable forms are inserted which result in the production of voids 74. These communicate with resilient clips 70 and provide receiving areas for receiving knife elements 58 in the initial stages of interengaging the case sections and coupling the electrical elements together.

Further to sell off the coupling, there is provided a shield member 80 secured to case 12 by means of bolts 82 and a shield member 84 secured to case section 14 by means of bolts 86. Both of these shield elements have extensions 80a and 82a respectively, which overlie cooperating extensions 12a and 14a of case sections 12, 14 and house the inner ends of air conduit 30a and cable 40a to maintain them steady and inflexible during operation of the truck-trailer, FIG. 2.

In the use of the composite air and electrical coupling of our invention, one of case segments is secured rigidly to one of the truck-trailer units and the other flexibly to the other of the truck-trailer units. The two case sections are nested or telescoped on edge one within the other. This brings the air conduit sections into registration. It also introduces knife switch elements 58 into receiving areas 74. A downward twist of the flexibly mounted section will wipe the knife elements into the spring clip elements 70 of the switch. This is the operative position of the coupling. It is maintained in this position by means of spring pressed detent 22, as well as gravitationally by the weight of the flexibly mounted section.

The unit thus is maintained in its operative condition, shielded from dirt and protected from vibration. When it is desired to uncouple it, a simple reverse twist of the case sections will accomplish the desired result.

It is to be understood that the form of our invention herein shown and described is to be taken as an illustrative example of the same and that various changes in the shape, size and arrangement of parts may be resorted to without departing from the spirit of our invention.

Having thus described our invention, we claim:

1. A composite air and electrical coupling comprising
  (a) a hollow case formed in two laterally telescoping, cupped sections,
  (b) interengaging means reelasably interengaging the case sections when they are telescoped together face to face and rotated from first to second positions of adjustment, (c) air conduit means formed in two sections, one section communicating with a source of air under pressure and the other with a device to be operated, (d) the conduit sections being associated one with each of the case sections with their respective ends registering with each other in the central portion of the case sections when the case sections are interengaged, (e) at least one electrical conductor formed in two sections, one section being electrically connected to a source of electrical energy and the other to an electrical device to be operated, and (f) two-part electrical connector means connected to each of the conductor sections and mounted with one part in each of the case sections for operative engagement as the case sections are rotated from their first to their second positions of adjustment.

2. The coupling of claim 1 wherein the case sections are formed with central recesses registering with each other when the case sections are interengaged, the air conduit sections communicating one with each of the respective recesses.

3. The coupling of claim 1 wherein there are a plurality of electrical conductors spaced outwardly radially from the air conduit means and spaced angularly from each other.

4. The coupling of claim 1 wherein the electrical connector means comprise electrically conducting, cooperating knife and socket elements mounted one in each of the respective case sections.

5. The coupling of claim 1 including spring biased plunger and detent means mounted respectively one on each of the case sections and operative releasably to maintain the case sections interengaged with each other in said second position.

References Cited

UNITED STATES PATENTS

| | | | |
|---|---|---|---|
| 410,552 | 9/1889 | Kennedy | 285—72 |
| 803,648 | 11/1905 | Williams | 285—68 XR |
| 882,503 | 3/1908 | Kilpatrick | 285—69 |
| 1,011,727 | 12/1911 | Blair | 285—119 XR |
| 3,066,276 | 11/1962 | Hubbell et al. | |

RICHARD E. MOORE, Primary Examiner

P. A. CLIFFORD, Assistant Examiner

U.S. Cl. X.R.

285—68; 339—49